United States Patent
Hamilton et al.

(10) Patent No.: US 10,557,554 B2
(45) Date of Patent: Feb. 11, 2020

(54) MECHANICAL SEAL WITH HIGH PRESSURE HIGH TEMPERATURE SECONDARY SEAL

(71) Applicant: Flowserve Management Company, Irving, TX (US)

(72) Inventors: Eric Hamilton, Wildomar, CA (US); Daniel Nelson, Wildomar, CA (US)

(73) Assignee: Flowserve Management Company, Irving, TX (US)

( * ) Notice: Subject to any disclaimer, the term of this patent is extended or adjusted under 35 U.S.C. 154(b) by 72 days.

(21) Appl. No.: 16/008,214

(22) Filed: Jun. 14, 2018

(65) Prior Publication Data
US 2019/0383398 A1    Dec. 19, 2019

(51) Int. Cl.
*F16J 15/38*   (2006.01)
*F16J 15/36*   (2006.01)
*F16J 15/34*   (2006.01)

(52) U.S. Cl.
CPC ............ *F16J 15/38* (2013.01); *F16J 15/344* (2013.01); *F16J 15/3464* (2013.01); *F16J 15/363* (2013.01); *F16J 15/3452* (2013.01); *F16J 15/3472* (2013.01)

(58) Field of Classification Search
CPC .... F16J 15/3436; F16J 15/344; F16J 15/3452; F16J 15/3464; F16J 15/38
See application file for complete search history.

(56) References Cited

U.S. PATENT DOCUMENTS

| | | | | | |
|---|---|---|---|---|---|
| 2,220,771 | A | * | 11/1940 | McHugh | F16J 15/38 277/388 |
| 2,964,340 | A | * | 12/1960 | Kinzie | F16J 15/38 277/395 |
| 3,297,331 | A | * | 1/1967 | Tracy | F16J 15/38 277/396 |

(Continued)

FOREIGN PATENT DOCUMENTS

| | | |
|---|---|---|
| CN | 107588038 A | 1/2018 |
| JP | H06-019883 Y2 | 5/1994 |
| JP | 4837250 B2 | 12/2011 |

OTHER PUBLICATIONS

PCT Search Report and Written Opinion for Appl No. PCT/US2019/034567 dated Sep. 10, 2019, 11 pages.

*Primary Examiner* — Nicholas L Foster
(74) *Attorney, Agent, or Firm* — Maine Cernota & Rardin

(57) ABSTRACT

A secondary seal of a mechanical seal comprises an annular sealing gasket and backing plate surrounding a cylindrical sealing surface, all of which can be made of the same metallic material. The gasket is C-shaped in cross section, and is axially pressed during operation into a C-shaped groove formed in the backing plate, the groove being shallower and larger in inner diameter than the gasket, so that the gasket, when pressed into the groove, deforms radially inward and seals against both the backing plate and the sealing surface. The contact area between the gasket and sealing surface increases with pressure. In embodiments, when the pressure is released, the gasket retracts from the sealing surface, allowing easy disassembly and allowing axial movement of the gasket and backing plate. Highly polished surfaces of the gasket and sealing surface can allow axial motion thereof during operation to maintain the seal face gap.

14 Claims, 8 Drawing Sheets

(56) References Cited

U.S. PATENT DOCUMENTS

| | | | | |
|---|---|---|---|---|
| 4,438,936 | A | | 3/1984 | Schlegel |
| 5,370,403 | A | * | 12/1994 | Sedy .................... F16J 15/3452<br>277/390 |
| 5,560,622 | A | * | 10/1996 | Sedy .................... F16J 15/3452<br>277/390 |
| 5,700,013 | A | * | 12/1997 | Baty ...................... F16J 15/025<br>277/340 |
| 5,813,674 | A | * | 9/1998 | Dickie .................... F16J 15/38<br>277/390 |
| 6,464,231 | B2 | * | 10/2002 | Burroughs ............. F16J 15/363<br>277/385 |
| 7,240,904 | B2 | * | 7/2007 | Droscher ............. F16J 15/3464<br>277/349 |
| 8,240,672 | B2 | * | 8/2012 | Grace .................... F16J 15/166<br>277/353 |
| 2002/0074732 | A1 | | 6/2002 | Burroughs |

\* cited by examiner

MECHANICAL SEAL WITH HIGH PRESSURE HIGH TEMPERATURE SECONDARY SEAL

STATEMENT OF GOVERNMENT INTEREST

This invention was made under CRADA 1872.00.00 between Flowserve and Sandia National Labs operated for the United States Department of Energy. The Government may have certain rights in this invention.

FIELD OF THE INVENTION

The invention relates to rotating shaft seals, and more particularly, to rotating shaft mechanical seals.

BACKGROUND OF THE INVENTION

A mechanical seal is a seal that is formed by close proximity of two flat, annular, non-contacting seal faces, usually referred to as a static seal face and a rotating seal face, in that one face is typically static and sealed to a housing, while the other face is sealed to a rotating shaft and rotates with the shaft. The two seal faces are annular, and coaxial with the rotating shaft, whereby the long axis of the shaft is also the common axis of the annular seal faces.

Traditionally the two seal faces are lapped flat to a very high degree of flatness, which allows the faces to be configured in a parallel relationship whereby they are not physically in contact with each other, but are separated by a gap that can be as narrow as one micron or less. The gap itself is also annular in shape, and shares a common central axis with the two annular seal faces, and with the rotating shaft. Geometrically, the configuration of a mechanical seal is such that, if each of the annular seal faces were considered to lie in a plane, then the planes of the annular seal faces would be parallel to each other, and both would be perpendicular to the central axis of the rotating shaft.

The gap between the seal faces in a mechanical seal is filled with a film formed by fluid that is radially forced into the gap from either or both of the inner and outer boundaries of the gap due to differential pressure between the inner and outer boundaries. The film serves to lubricate the gap, and to maintain the separation of the faces so that they do not mechanically wear against each other. Often, but not always, this lubricating fluid is process fluid. It is inherent to mechanical seals that during operation a very small amount of the lubricating fluid leaks radially across the gap, i.e. from the inner boundary of the annular gap to the outer boundary of the gap, and/or vice versa. The amount of leakage varies according to the design and application, but a typical amount would be about one quarter of a teaspoon per hour. Generally, this is such a small amount that if the leaked fluid is a liquid, it tends to evaporate rather than pool, and therefore remains unnoticed.

Generally, it is not practical to permanently fix the seal faces to the shaft and housing. Instead, secondary seals are provided between the stationary seal face and the housing, and between the rotating seal face and the rotating shaft.

The effectiveness of a mechanical seal depends heavily on maintaining a very narrow gap between the seal faces. Typically, one of the seal faces is configured to be axially movable, and an axial force is applied thereto during operation so as to press it toward the other seal face and thereby compensate for wear, axial thrust, thermal expansion, and/or any other mechanism that might compromise the gap between the seal faces. Depending on the design of the seal, the axial thrust can be applied by a pressurized process fluid, and/or by a mechanical loading that is provided by a spring, bellows, or other pressing mechanism. This applied axial force is opposed by a hydrodynamic pressure of the lubricating fluid within the gap, thereby creating an equilibrium that maintains the small but finite gap size.

So as to accommodate the axial movements of the axially movable seal face, it is necessary for the associated secondary seal to be axially adaptive, in that it must maintain the secondary seal between the seal face and its associated structure (housing or rotating shaft) as the seal face is axially moved. Either of two types of axially adaptive secondary seal are typically used for this purpose, either a "pusher" secondary seal or a "non-pusher" secondary seal. Pusher secondary seals are secondary seals for which the element forming the seal is axially mobile. Typically, an O-ring is used to form a seal with a cylindrical element that is co-axial with the seal faces and is fixed to the housing or shaft, so that the O-ring is able to roll along the cylindrical element as the axially movable seal face undergoes axial movements. These O-ring pusher seals respond well to elevated pressures, due to the elastomeric deformation of the O-ring, which increases the contact area of the seal when the applied pressure is increased.

Non-pusher seals are secondary seals for which the element that forms the seal remains fixed in its attachment to the housing or shaft, and accommodates the axial movements of the associated seal face by expanding or contracting. In low temperature applications, an expandable, elastomeric gasket is sometimes used, whereas for high temperature applications a bellows is often used. In either case, the contact area of the seal does not typically increase with pressure for a non-pusher secondary seal.

During operation, a mechanical seal is necessarily subjected to both the temperature and pressure of the process fluid. For this reason, the use of a secondary seal that includes a gasket and/or O-ring can limit the maximum temperature at which a mechanical seal can operate, due to temperature limitations of the elastomer. Non-pusher secondary seals that use a metal bellows can withstand higher operating temperatures as compared to elastomer secondary seals, but metallic bellows seals are complex, expensive, difficult to install and remove, subject to metal fatigue, and are still sometimes not able to withstand the full range of temperatures that may be desirable for a given application.

What is needed, therefore, is a high temperature, high pressure secondary seal design that is simple in design, easy to install and remove, extends the operating temperature range of a mechanical seal beyond existing limits, and preferably facilitates axial movement of an associated seal face.

SUMMARY OF THE INVENTION

A high temperature, high pressure secondary seal design is disclosed that is simple in design (at least compared to a metallic bellows seal), easy to install and remove, extends the operating temperature range of a mechanical seal beyond existing limits, and, in embodiments, facilitates axial movement of an associated seal face. The novel secondary seal design includes an annular sealing gasket and a backing plate that surround an underlying cylindrical sealing surface, which can be the outer surface of the rotating shaft, or of a collar that surrounds the rotating shaft and is fixed to either the shaft or to the housing. In embodiments, all three of these elements are made of the same metallic material, so that effects of expansion and contraction with temperature are minimized. In embodiments, the metallic material is Alloy 718 or another "super alloy" that maintains its strength at high temperatures.

During operation, the sealing gasket is configured to press radially inward so as to form a radial seal with the sealing surface, while also pressing axially against the backing plate to form an axial seal therewith. The backing plate, in turn, is either unitary with the associated seal face, permanently bonded to the seal face, or is otherwise sealed to the seal face.

The sealing gasket is shaped as approximately one-half of a hollow ring, so that the cross section thereof is shaped approximately like a capital letter "C". In embodiments, the sealing gasket is manufactured through a stamping process, whereby an initially flat, annular metal ring is pressed between two close tolerance forms to create the "C" cross-sectional shape. Accordingly, the sealing gasket is much simpler and less expensive to manufacture than a typical non-pusher, metallic bellows.

The curved portion of the C-shaped sealing gasket profile is directed toward a C-shaped groove provided in the backing plate, so that when axial pressure is applied, the gasket is pressed into the groove. However, the groove in the backing plate ends before it reaches the underlying sealing surface, so that the radially innermost portion of the gasket is exposed. This allows the inner radius of the C-shaped sealing gasket to deform under pressure and form an enhanced seal against the sealing surface.

In embodiments, the wall of the sealing gasket has a constant thickness, which in embodiments is about 0.005 inches. In various embodiments, the inner diameter of the sealing gasket is slightly smaller than the outer diameter of the cylindrical sealing surface, for example between 0.0005 and 0.001 inches smaller on the diameter, creating an initial interference fit (i.e. a press-fit) against the underlying sealing surface before pressure is applied for the first time.

According to the present disclosure, the outer surface of the sealing gasket, the inner surface of the backing plate groove, and the underlying sealing surface are all prepared with a highly smooth finish. In embodiments, the finish of all of these surfaces has an Ra of 16 micro-inches or less. The backing plate or plate will have a groove with similar dimensions to that of the secondary sealing gasket. Specifically, the constant radius cross section of the gasket mentioned above will match the radius of the groove in the backing plate.

In embodiments, the radially outward diameter of the backing plate groove is slightly smaller than the outer diameter of the gasket, for example between 0.001 and 0.002 inches smaller in diameter, so that the sealing gasket fits tightly in the groove. In various embodiments, a retaining ring or snap ring is used to retain the gasket within the groove of the backing plate during initial assembly of the disclosed secondary seal.

As noted above, in embodiments, after assembly and before initial operation, the inner diameter of the sealing gasket forms an interference fit with the outer diameter of the cylindrical sealing surface at ambient pressure and temperature. During operation, as the applied pressure and temperature of the process fluid increases, the sealing gasket is pressurized against the groove provided in the backing ring, causing it to yield and conform to the exact shape of the groove. At the same time, the exposed inner diameter of the gasket is pressed downward, so that it deforms against the outer diameter of the cylindrical sealing surface and the region of contact transitions from a line of contact to a surface of contact. As the pressure continue to increase, the area of the contact surface increases, improving the quality of the seal that prevents the pressurized fluid from passing between the inner diameter of the gasket and the outer diameter of the cylindrical surface.

While the exposed inner rim of the sealing gasket is deformed by pressure against the sealing surface, the backing ring supports the remainder of the sealing gasket from full exposure to extreme pressures that could otherwise cause excessive yielding and even potential failure of the sealing gasket. Due to their smooth surface finishes, the seal face, backing plate, and sealing gasket are able to move axially along the cylindrical sealing surface during pressurized operation with limited opposition from frictional forces therebetween.

When operation ceases and the operating fluid pressure is relieved, the deformed inner diameter of the gasket naturally retracts away from the underlying sealing surface, thereby creating a clearance fit to the cylindrical sealing surface, and allowing the sealing gasket, backing plate, and associated seal face to be easily removed and reinstalled during disassembly and maintenance. In embodiments, the clearance of the clearance fit is between 0.0005 and 0.001 inches. Nevertheless, upon re-pressurizing during subsequent operation, the seal is improved and the leakage past the gasket, if any, is reduced in comparison to the initial operation.

In embodiments, the sealing gasket is manufactured via a stamping process, wherein a flat sheet-metal ring is pressed between two close-tolerance forms. This allows the mechanical seal faces to maintain the appropriate gap required for operation at all times. Additionally, in embodiments the sealing gasket, backing plate, and sealing surface are all composed of identical materials, so that thermal expansion is uniform throughout the secondary seal, thereby preventing any one of the components from unintentionally expanding or contracting away from or into one of the others. As a result, all established clearances and interferences are maintained regardless of temperature variations.

The present invention is a mechanical seal that includes a high pressure, high temperature compatible secondary seal. The mechanical seal includes first and second seal faces sealed to corresponding first and second structures, one of the seal faces being a rotating seal face surrounding, fixed to, and coaxial with a rotating shaft, the other of the seal faces being a static seal face coaxial with the rotating seal face and fixed to a static housing, the seal faces having opposing sealing surfaces in close proximity to each other, thereby forming a non-contacting primary seal therebetween.

The first seal face is sealed to the first structure by a secondary seal that includes a cylindrical sealing surface surrounding and coaxial with the rotating shaft, and sealed to the first structure, an annular backing plate surrounding and coaxial with the rotating shaft and sealed to the first seal face, and an annular, metallic sealing gasket surrounding and coaxial with the sealing surface and proximal to the backing plate, the sealing gasket having an arcuate cross section that approximates a half-arc of a circle, curved axially toward the backing plate and terminated at an inner edge proximal to the sealing surface and an outer edge distal from the sealing surface.

An arcuate groove is formed in the backing plate proximal to the sealing gasket, the arcuate groove having an inner radius that is larger than the inner radius of the sealing gasket and a cross sectional curvature that is shallower than a curvature of the sealing gasket cross sectional shape, so that when the sealing gasket is axially pressed into the arcuate groove, it forms a seal with the backing plate while, at the same time, the inner edge of the sealing gasket is forced radially inward beyond the arcuate groove of the backing plate and against the sealing surface, thereby forming a seal with the sealing surface.

In embodiments, the backing plate, sealing gasket, and sealing surface are configured such that the inner edge of the sealing gasket initially forms a press-fit with the sealing surface before the sealing gasket is pressed into the arcuate groove.

In any of the above embodiments, before the sealing gasket is pressed into the arcuate groove, the diameter of the inner edge of the sealing gasket can be between 0.0005 and 0.001 inches smaller than the diameter of the sealing surface.

In any of the above embodiments, the backing plate, sealing gasket, and sealing surface can be configured such that, after the sealing gasket is pressed into the arcuate groove, the inner edge thereof forms a region of contact with the sealing surface that is shaped as a cylindrical band.

In any of the above embodiments, the backing plate, sealing gasket, and sealing surface can be configured such that, after the sealing gasket is forced by applied pressure into the arcuate groove, and subsequently said pressure is released, the inner edge of the sealing gasket is retracted from the sealing surface, forming a clearance fit gap therebetween. In some of these embodiments, the clearance fit gap is between 0.0005 and 0.001 inches wide.

In any of the above embodiments, the sealing gasket can be made from Alloy 718.

In any of the above embodiments, the sealing surface, the backing plate, and the sealing gasket can all be made from the same metallic material. In some of these embodiments, the sealing surface, the backing plate, and the sealing gasket are all made from Alloy 718.

In any of the above embodiments, the first seal face, backing plate, sealing gasket, and sealing surface can be axially movable relative to the second seal face.

In any of the above embodiments, the arcuate cross sectional shape of the sealing gasket can be uniform in thickness between the inner and outer edges thereof. In some of these embodiments, the uniform thickness of the sealing gasket is approximately 0.005 inches.

In any of the above embodiments, an outer surface of the sealing gasket, an inner surface of the arcuate groove, and the sealing surface can be all prepared with a finish having an Ra of 16 micro-inches or less.

And in any of the above embodiments, an outer edge of the arcuate groove can be between 0.001 and 0.002 inches smaller in diameter than the outer edge of the sealing gasket.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
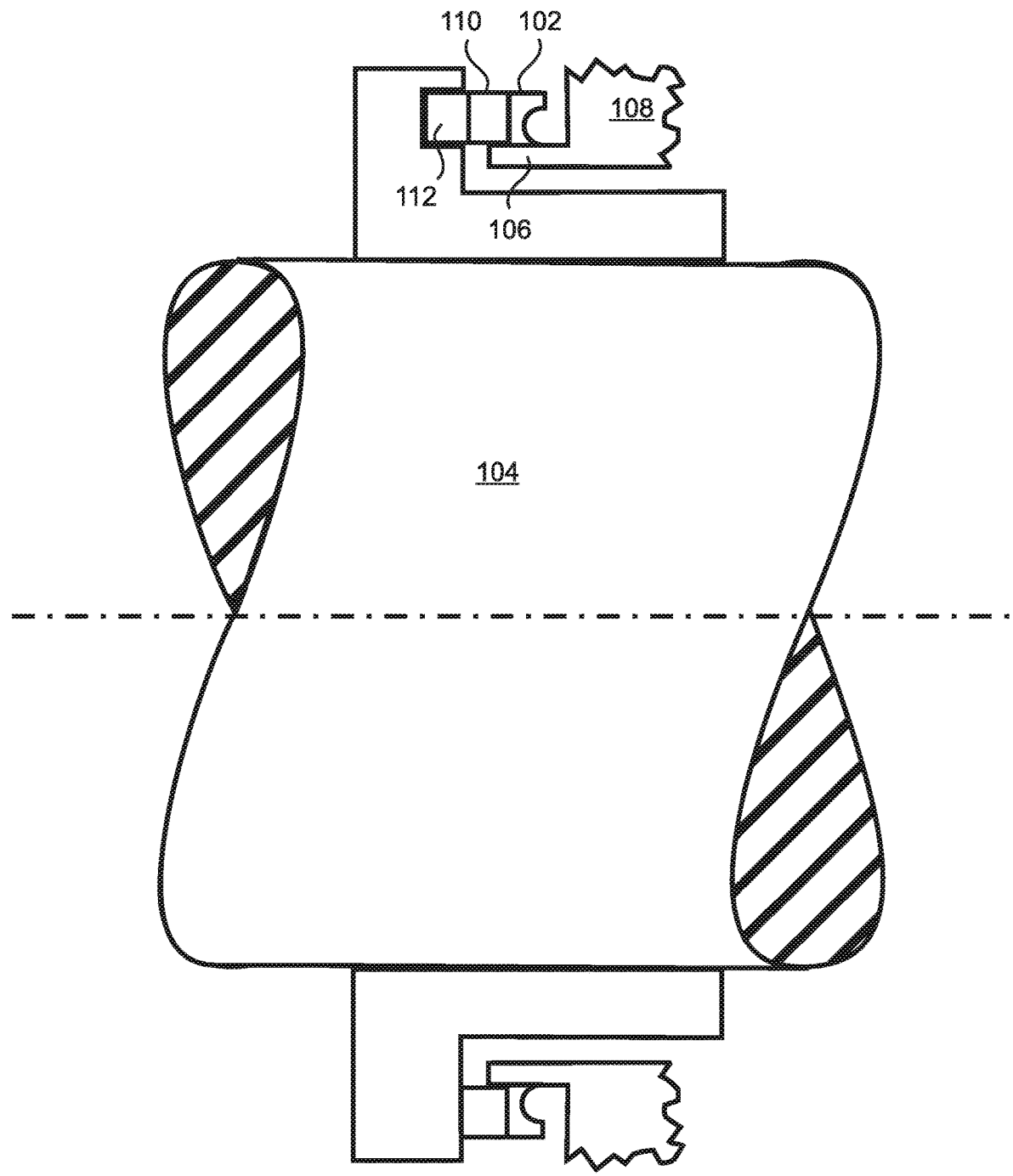
FIG. 1 is a side, cross sectional view of an embodiment of the present invention.
Figure 2:
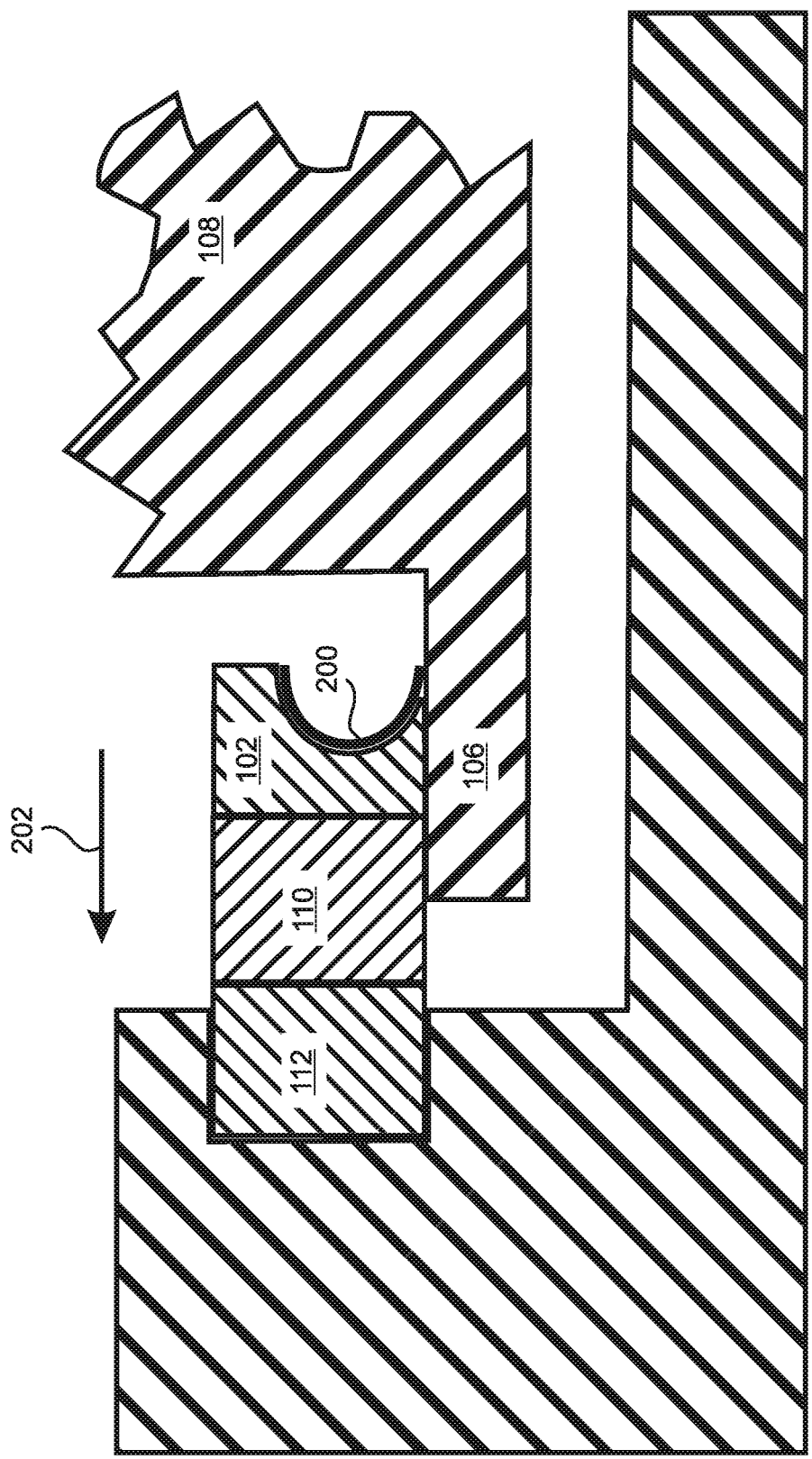
FIG. 2 is a magnified, cross sectional view of the secondary seal in an embodiment of the present invention and the surrounding structure.

The present invention is a high temperature, high pressure static seal design that extends the operating temperature range of a mechanical seal beyond existing limits, and which preferably facilitates axial movement of an associated seal face. With reference to FIGS. 1 and 2, the novel seal design includes an annular sealing gasket 200 and a backing plate 102 that surround an underlying cylindrical sealing surface, which can be the outer surface of the rotating shaft 104 or of a collar 106 that surrounds the rotating shaft and is fixed to either the shaft 104 or to the housing 108. In the embodiment of FIGS. 1 and 2, the sealing surface is a collar 106 that surrounds the shaft 104, but is static and fixed to the housing 108. The backing plate 102 is sealed to an associated seal face 110, which in FIGS. 1 and 2 is the static seal face 110, which forms a seal with the other seal face 112, which in FIGS. 1 and 2 is the rotating seal face 112. Although no specific mechanism is shown in the drawing, embodiments include a spring, bellows, or other mechanism that applied a longitudinal force 202 onto the backing plate 102 and associated seal face 110, so as to move the seal face 110 axially to compensate for wear, axial thrust, and other phenomena that might otherwise compromise the gap between the seal faces 110, 112.

In embodiments, the sealing gasket 200, backing plate 102, and sealing surface 106 are all made of the same metallic material, so as to permit operation at very high temperatures. In embodiments, the metallic material is Alloy 718 or another "super alloy" that maintains its strength at high temperatures. The sealing gasket 200 is configured to press radially inward so as to form a radial seal with the sealing surface 106, while also pressing axially against the backing plate 102 to form an axial seal therewith. The backing plate 102, in turn, is either unitary with the associated seal face 110, permanently bonded to the seal face 110, or is otherwise sealed to the seal face 110.

Figure 3A:
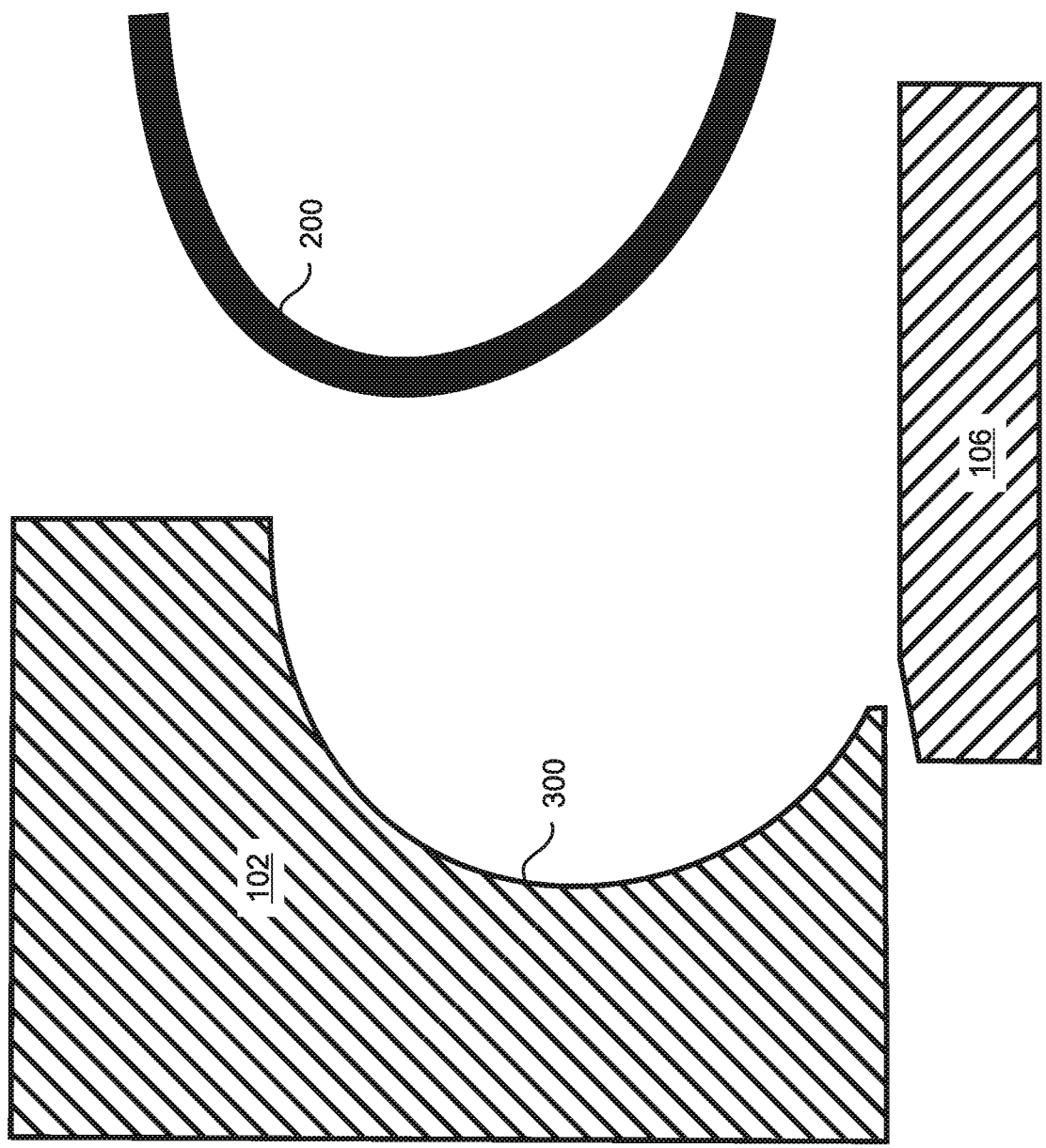
FIG. 3A is an exploded side cross sectional view of the secondary seal in an embodiment of the present invention.
Figure 3B:
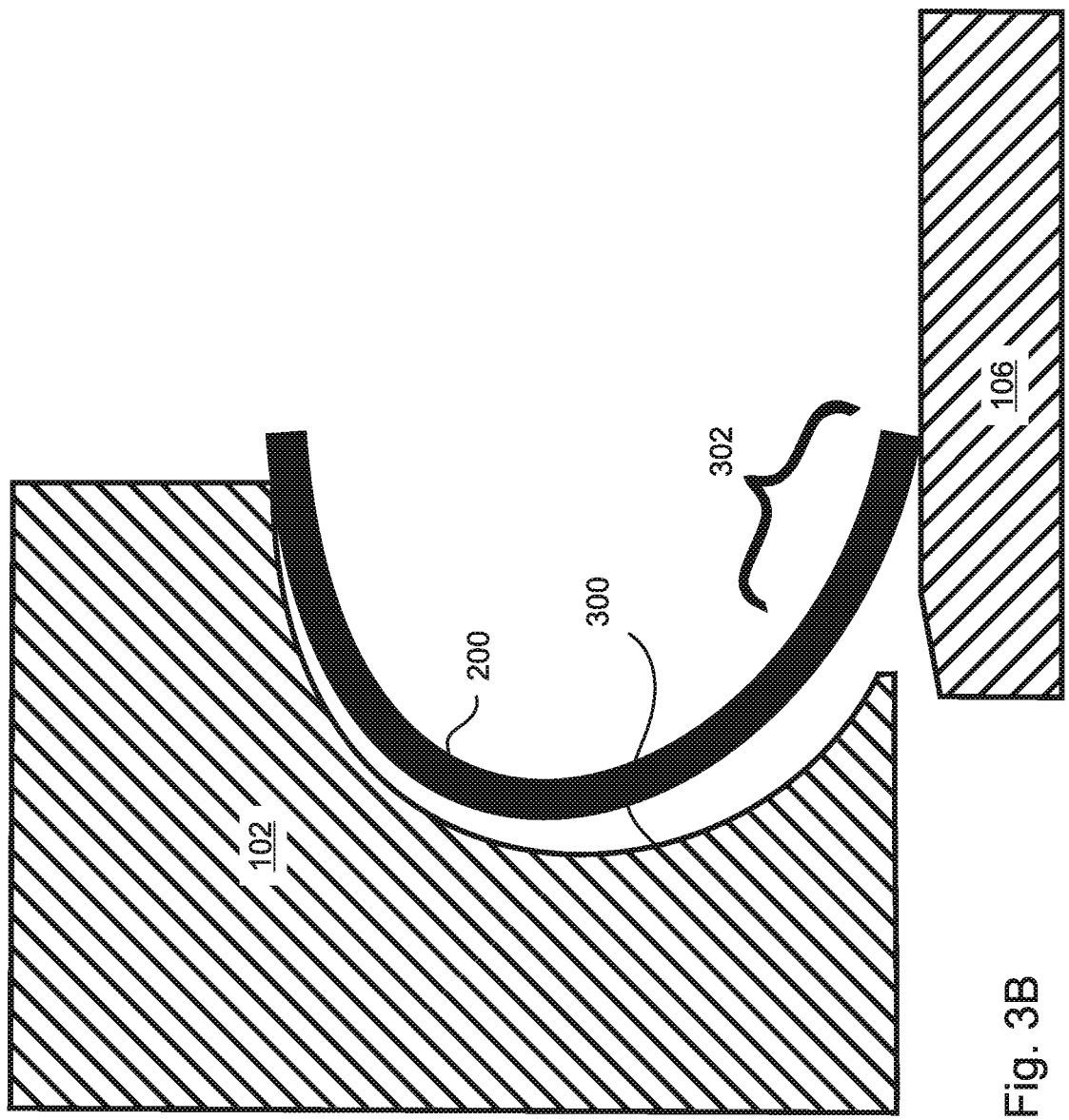
FIG. 3B is an assembled cross sectional view of the embodiment of FIG. 3A, shown in its initial configuration before operation.
Figure 4:
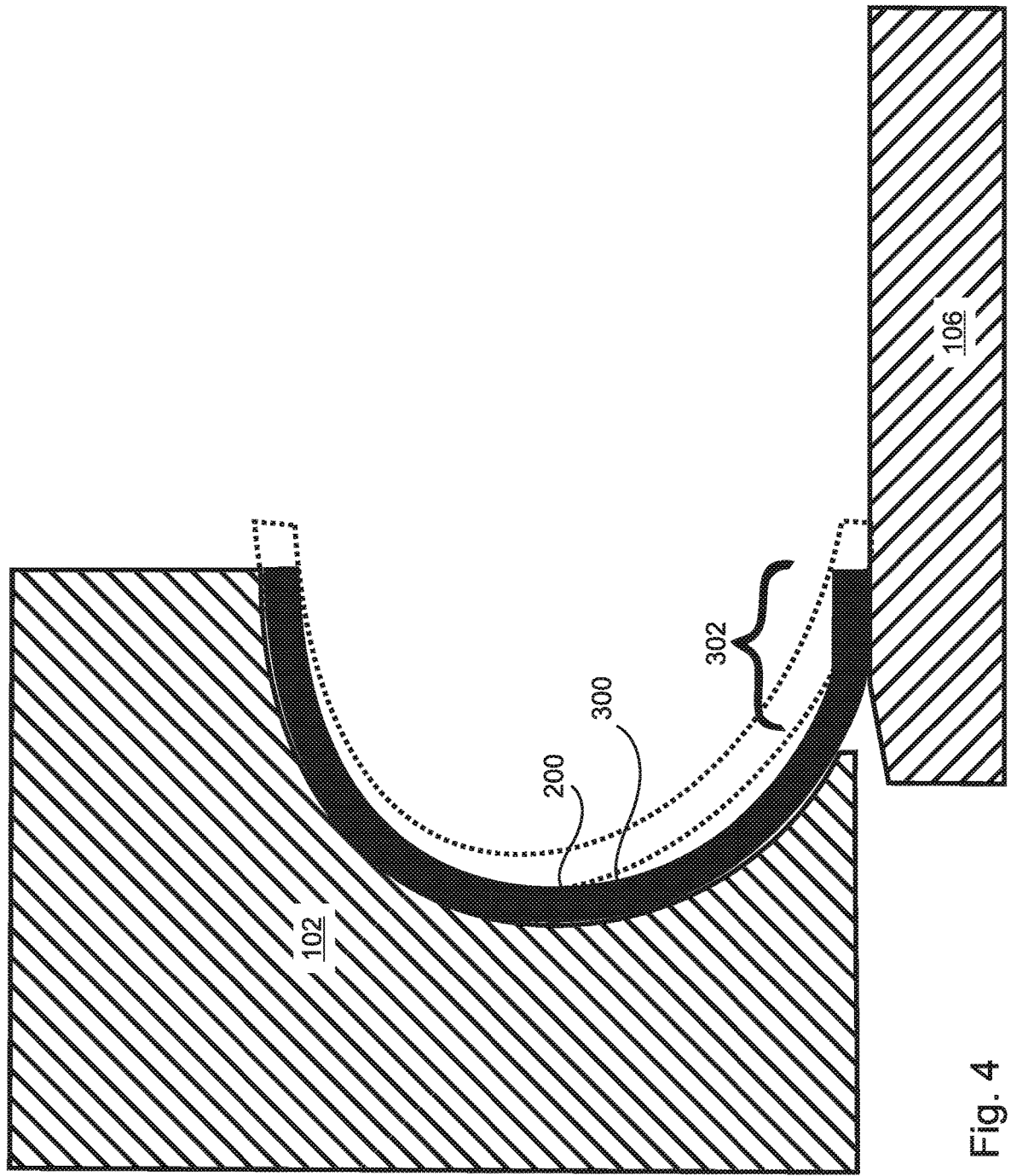
FIG. 4 is a cross sectional view of the embodiment of FIG. 3B, comparing the shape of the sealing gasket before and after deformation due to applied pressure.

With reference to FIG. 3A, the sealing gasket 200 is shaped as approximately one-half of a hollow ring, so that the cross section thereof is shaped approximately like a capital letter "C". The curved portion of the C-shaped gasket profile is directed toward a C-shaped groove 300 provided in the backing plate 102, so that when axial pressure 202 is applied, the gasket 200 is pressed into the groove 300. However, as can be seen in FIG. 3B, the groove 300 in the backing plate 102 ends before it reaches the underlying sealing surface 106, so that the radially innermost portion 302 of the gasket 200 is exposed. This allows the inner portion 302 of the C-shaped sealing gasket 200 to deform under pressure and form an enhanced seal against the sealing surface 106, as is illustrated in FIG. 4.

In embodiments, the wall of the sealing gasket 200 has a constant thickness, which in embodiments is about 0.005 inches. In various embodiments, the inner diameter of the sealing gasket 200 is slightly smaller than the outer diameter of the cylindrical sealing surface 106, for example between 0.0005 and 0.001 inches smaller on the diameter, creating an initial interference fit (i.e. a press-fit) against the underlying sealing surface 106, as illustrated in FIG. 3B, before pressure is applied for the first time.

According to the present disclosure, the outer surface of the sealing gasket 200, the inner surface of the backing plate groove 300, and the underlying sealing surface 106 are all prepared with a highly smooth finish. In embodiments, the finish of all of these surfaces has an Ra of 16 micro-inches or less.

In embodiments, the groove 300 in the backing plate 102 has similar dimensions to the sealing gasket 200. In some of these embodiments, the radially outward diameter of the backing plate groove 300 is slightly smaller than the outer diameter of the gasket 200, for example between 0.001 and 0.002 inches smaller in diameter, so that the sealing gasket 200 fits tightly into the groove 300. In various embodiments, a retaining ring or snap ring is used to retain the gasket 200 within the groove 300 of the backing plate 102 during initial assembly of the disclosed secondary seal.

As noted above, in embodiments, after assembly and before initial operation, the inner diameter of the sealing gasket 200 forms an interference fit with the outer diameter of the cylindrical sealing surface 106 at ambient pressure and temperature, as illustrated in FIG. 3B. With reference to FIG. 4, during operation, as the applied pressure and temperature of the process fluid increases, the sealing gasket 200 is pressurized against the groove 300 provided in the backing plate, causing it to yield and conform to the exact shape of the groove 300. At the same time, the exposed inner diameter of the gasket 200 is pressed downward, so that it deforms against the outer diameter of the cylindrical sealing surface 106, and the region of contact 302 transitions from a line of contact to a surface of contact 302. Note that In FIG. 4, the initial shape of the sealing gasket 200, as shown in FIGS. 3A and 3B, is indicated for comparison using dashed lines.

As the process fluid pressure continue to increase, the area of the contact surface 302 increases, improving the quality of the seal that prevents the pressurized fluid from passing between the inner diameter of the gasket 200 and the outer diameter of the cylindrical surface 106.

While the exposed inner rim 302 of the sealing gasket 200 is deformed by pressure against the sealing surface 106, the backing plate 102 supports the remainder of the sealing gasket 200 from full exposure to extreme pressures that could otherwise cause excessive yielding and even potential failure of the sealing gasket 200. Due to their smooth surface finishes, the seal face 110, backing plate 102, and sealing gasket 200 are able to move axially along the cylindrical sealing surface 106 during pressurized operation with limited opposition from frictional forces therebetween.

Figure 5:
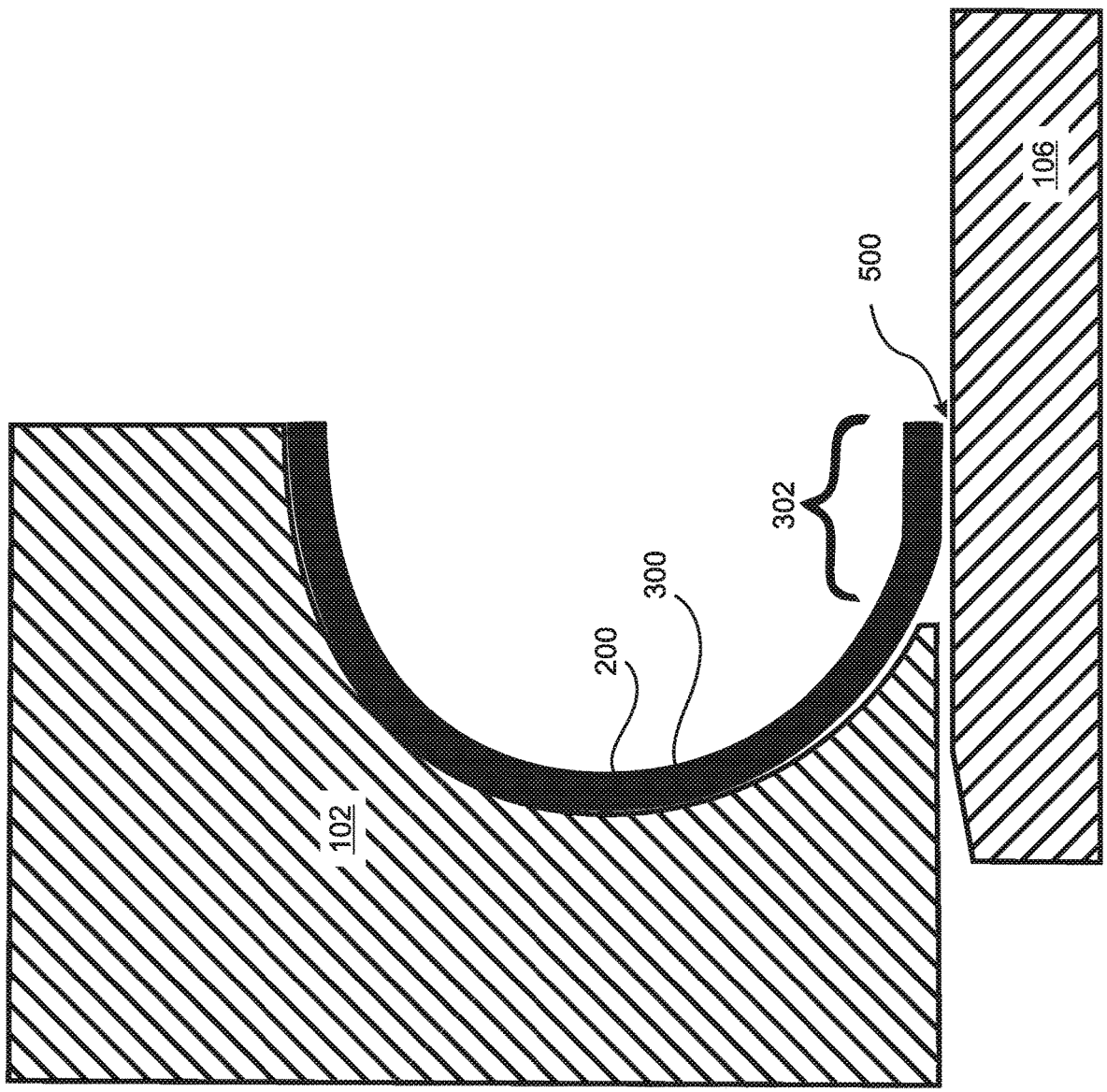
FIG. 5 is a cross sectional view of the embodiment of FIG. 4, showing an increased contact area between the sealing gasket and the sealing surface due to increased pressure.

With reference to FIG. 5, when operation ceases and the operating fluid pressure is relieved, the deformed inner diameter 302 of the sealing gasket 200 naturally retracts away from the underlying sealing surface 106, thereby creating a clearance fit to the cylindrical sealing surface 106, and allowing the sealing gasket 200, backing plate 102 and associated seal face 110 to be easily removed and reinstalled during disassembly and maintenance. In embodiments, the clearance 500 of the clearance fit is between 0.0005 and 0.001 inches.

Figure 6:
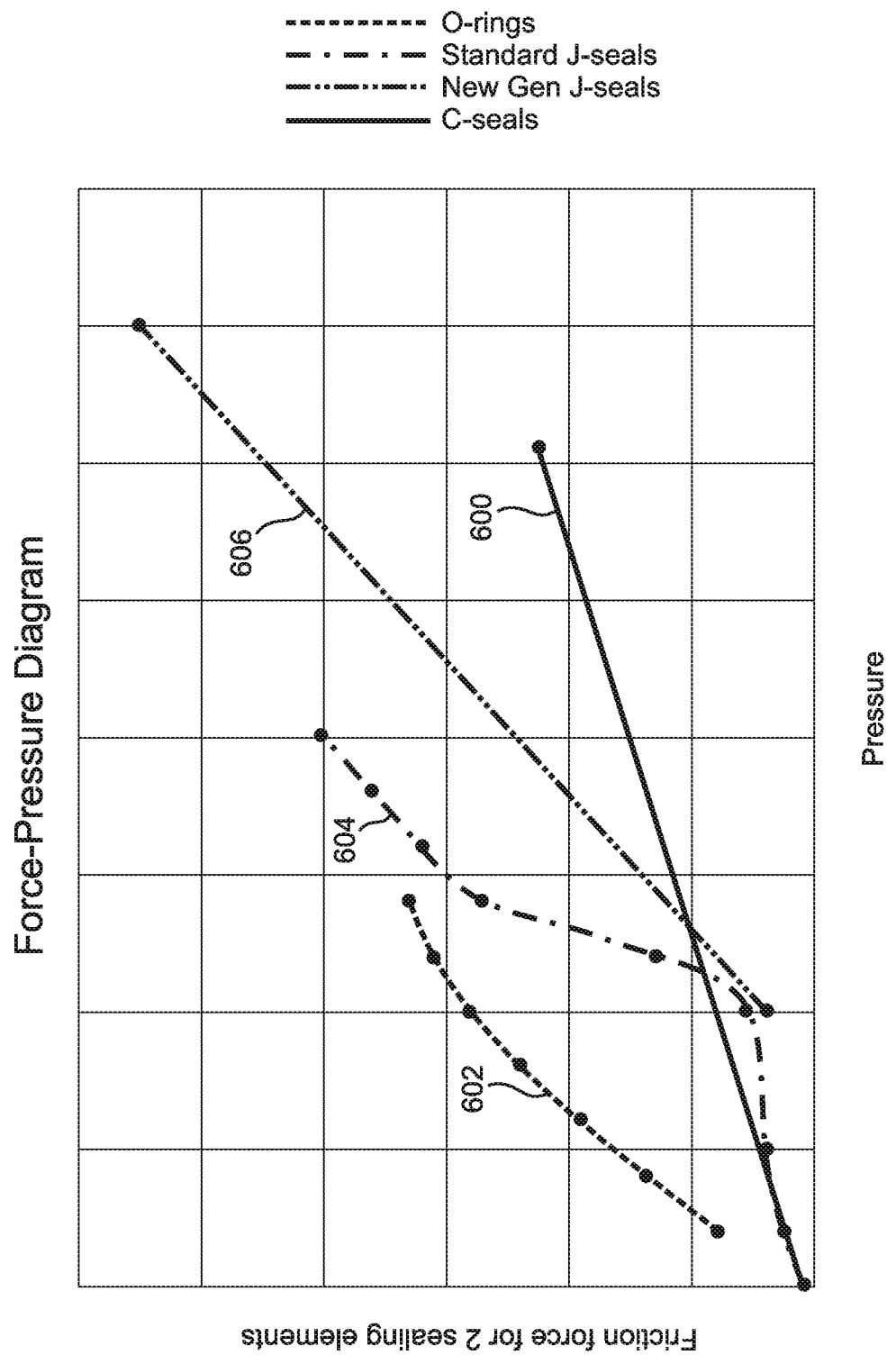
FIG. 6 is a graph of frictional forces opposing axial movement of the secondary seal as a function of pressure for an embodiment of the present invention in comparison with other secondary seal designs.

FIG. 6 is a graph that presents breakout friction data for required axial load 202 to axially move the sealing gasket 200 in an embodiment ("C-seals") 600 at various pressures, in comparison with O-ring 602 and J-seal technologies 604, 606.

Figure 7:
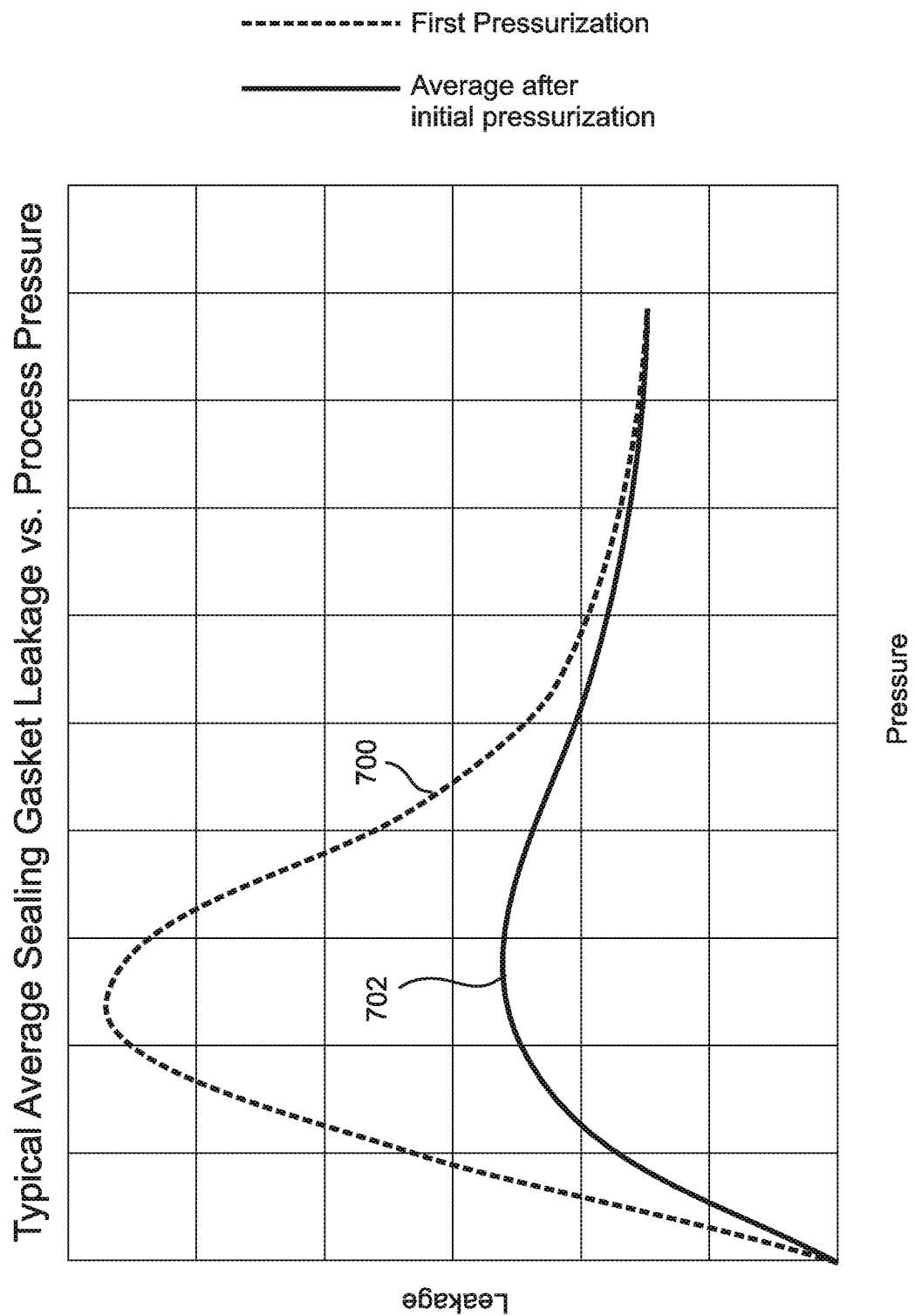
FIG. 7 is a graph comparing leakage past the secondary seal in an embodiment of the present invention as a function of pressure during first pressurization thereof, and subsequent pressurization thereof.

Despite the clearance fit that results after initial operation and pressurization, the seal is improved and the leakage past the gasket, if any, is reduced during subsequent operations and pressurizations, as compared to the initial operation. FIG. 7 is a graph that presents typical average process fluid leakage through a secondary seal in embodiments of the present invention, where the "First Pressurization" curve 700 shows leakage during initial operation, wherein the sealing gasket 200 is initially deformed against the sealing surface 106, and the "Average after initial pressurization" curve 702 shows test averages during subsequent operation.

In embodiments, the sealing gasket 200 is manufactured via a stamping process, wherein a flat sheet-metal ring is pressed between two close-tolerance forms. This allows the mechanical seal faces 110, 112 to maintain the appropriate gap required for operation at all times. Additionally, in embodiments the sealing gasket 200, backing plate 106, and sealing surface 106 are all composed of identical materials, so that thermal expansion is uniform throughout the secondary seal, thereby preventing any one of the components 200, 102, 106 from unintentionally expanding or contracting away from or into one of the others. As a result, all established clearances and interferences are maintained regardless of temperature variations.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:
1. A mechanical seal comprising:
   first and second seal faces sealed to corresponding first and second structures, one of the seal faces being a rotating seal face surrounding, fixed to, and coaxial with a rotating shaft, the other of the seal faces being a static seal face coaxial with the rotating seal face and fixed to a static housing, the seal faces having opposing sealing surfaces in close proximity to each other, thereby forming a non-contacting primary seal therebetween;

the first seal face being sealed to the first structure by a secondary seal comprising:

a cylindrical sealing surface surrounding and coaxial with the rotating shaft, and sealed to the first structure;

an annular backing plate surrounding and coaxial with the rotating shaft and sealed to the first seal face;

an annular, metallic sealing gasket surrounding and coaxial with the sealing surface and proximal to the backing plate, the sealing gasket having an arcuate cross section that approximates a half-arc of a circle, curved axially toward the backing plate and terminated at an inner edge proximal to the sealing surface and an outer edge distal from the sealing surface; and an arcuate groove formed in the backing plate proximal to the sealing gasket, the arcuate groove having an inner radius that is larger than a radius of the inner edge of the sealing gasket and a cross sectional curvature that is shallower than a curvature of the sealing gasket's cross sectional shape, so that when the sealing gasket is axially pressed into the arcuate groove, it forms a seal with the backing plate while, at the same time, the inner edge of the sealing gasket is forced radially inward beyond the arcuate groove of the backing plate and against the sealing surface, thereby forming a seal with the sealing surface.

2. The mechanical seal of claim 1, wherein the backing plate, sealing gasket, and sealing surface are configured such that the inner edge of the sealing gasket initially forms a press-fit with the sealing surface before the sealing gasket is pressed into the arcuate groove.

3. The mechanical seal of claim 2, wherein before the sealing gasket is pressed into the arcuate groove, the diameter of the inner edge of the sealing gasket is between 0.0005 and 0.001 inches smaller than the diameter of the sealing surface.

4. The mechanical seal of claim 1, wherein the backing plate, sealing gasket, and sealing surface are configured such that, after the sealing gasket is pressed into the arcuate groove, the inner edge thereof forms a region of contact with the sealing surface that is shaped as a cylindrical band.

5. The mechanical seal of claim 1, wherein the backing plate, sealing gasket, and sealing surface are configured such that, after the sealing gasket is forced by applied pressure into the arcuate groove, and subsequently said pressure is released, the inner edge of the sealing gasket is retracted from the sealing surface, forming a clearance fit gap therebetween.

6. The mechanical seal of claim 5, wherein the clearance fit gap is between 0.0005 and 0.001 inches wide.

7. The mechanical seal of claim 1, wherein the sealing gasket is made from Alloy 718.

8. The mechanical seal of claim 1, wherein the sealing surface, the backing plate, and the sealing gasket are all made from the same metallic material.

9. The mechanical seal of claim 8, wherein the sealing surface, the backing plate, and the sealing gasket are all made from Alloy 718.

10. The mechanical seal of claim 1, wherein the first seal face, backing plate, sealing gasket, and sealing surface are axially movable relative to the second seal face.

11. The mechanical seal of claim 1, wherein the arcuate cross sectional shape of the sealing gasket is uniform in thickness between the inner and outer edges thereof.

12. The mechanical seal of claim 8, wherein the uniform thickness of the sealing gasket is approximately 0.005 inches.

13. The mechanical seal of claim 1, wherein an outer surface of the sealing gasket, an inner surface of the arcuate groove, and the sealing surface are all prepared with a finish having an Ra of 16 micro-inches or less.

14. The mechanical seal of claim 1, wherein an outer edge of the arcuate groove is between 0.001 and 0.002 inches smaller in diameter than the outer edge of the sealing gasket.

* * * * *